(12) United States Patent
Ramirez-Gutierrez et al.

(10) Patent No.: US 11,991,029 B2
(45) Date of Patent: May 21, 2024

(54) PHYSICAL RANDOM ACCESS CHANNEL SIGNAL GENERATION OPTIMIZATION FOR 5G NEW RADIO

(71) Applicant: Telefonaktiebolaget LM Ericsson (publ), Stockholm (SE)

(72) Inventors: Raymundo Ramirez-Gutierrez, Lund (SE); Naga Anjaneya Chandra Sekhara Reddy Ireddy, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 555 days.

(21) Appl. No.: 17/268,493

(22) PCT Filed: Aug. 20, 2018

(86) PCT No.: PCT/EP2018/072448
§ 371 (c)(1),
(2) Date: Feb. 15, 2021

(87) PCT Pub. No.: WO2020/038550
PCT Pub. Date: Feb. 27, 2020

(65) Prior Publication Data
US 2021/0315021 A1    Oct. 7, 2021

(51) Int. Cl.
*H04W 72/04* (2023.01)
*H04L 27/26* (2006.01)
(Continued)

(52) U.S. Cl.
CPC ...... *H04L 27/2613* (2013.01); *H04L 27/2628* (2013.01); *H04W 72/04* (2013.01); *H04W 72/0446* (2013.01); *H04W 74/0833* (2013.01)

(58) Field of Classification Search
CPC ......... H04W 72/0446; H04W 74/0833; H04W 72/04; H04L 27/2613; H04L 27/2628;
(Continued)

(56) References Cited

U.S. PATENT DOCUMENTS 9,007,250 B1* 4/2015 Jeraj ................ H03M 1/662
341/145
2005/0062622 A1* 3/2005 Miller ................ H03M 1/66
341/123

(Continued)

FOREIGN PATENT DOCUMENTS

WO    2017078607 A1    5/2017

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 12)", Technical Specification, 3GPP TS 36.211 V12.4.0, Dec. 1, 2014, pp. 1-124, 3GPP.

(Continued)

*Primary Examiner* — Jean A Gelin
(74) *Attorney, Agent, or Firm* — COATS & BENNETT, PLLC

(57) ABSTRACT

The present disclosure relates to a method for physical random access channel, PRACH, signal generation. The method comprises obtaining (S10) a first time-domain sequence (1010a) comprising a first set of time-domain samples. The method also comprises generating (S20) a second time-domain sequence (1040a) comprising a second set of time-domain samples, the second set of time-domain samples comprising the first set of time-domain samples and interpolated time-domain samples inserted between the samples of the first set of time-domain samples, the number of time-domain samples in the second set of time-domain (Continued)

samples matching a required number of samples needed for a digital-to-analogue converter, DAC, having a predetermined sampling rate, and providing (S50) the second time-domain sequence to the DAC. The present disclosure also relates to corresponding systems, user equipment, interpolation circuitry, PRACH control modules and associated methods, and computer program products.

13 Claims, 9 Drawing Sheets

(51) Int. Cl.
*H04W 72/0446* (2023.01)
*H04W 74/0833* (2024.01)

(58) Field of Classification Search
CPC ........... H04L 27/26416; H04L 27/2633; H04L 27/2647
See application file for complete search history.

(56) References Cited

U.S. PATENT DOCUMENTS

| | | |
|---|---|---|
| 2011/0216816 A1* | 9/2011 | Frenzel .................... H04B 1/38 375/259 |
| 2012/0250589 A1 | 10/2012 | Kerner et al. |
| 2015/0139238 A1 | 5/2015 | Pourzandi et al. |
| 2017/0180063 A1* | 6/2017 | Berscheid ........... H04L 27/2647 |
| 2017/0345433 A1* | 11/2017 | Dittmar .................. G10L 13/04 |

OTHER PUBLICATIONS

Choi, S. et al., "Filter Design of Interpolation-Based SC-FDMA Transmitter for Random Access Preamble Generation" 2015 International Conference on Information and Communication Technology Convergence (ICTC), Oct. 28, 2015, pp. 1319-1321, IEEE.

Qualcomm Incorporated, "Remaining Details of PRACH Formats", 3GPP TSG-RAN WG1 Meeting 92, Athens, Greece, Feb. 26, 2018, pp. 1-13, R1-1802813, 3GPP.

He, Y. et al., "An Efficient Implementation on PRACH Generator in LTE UE Transmitters", 2011 7th International Wireless Communications and Mobile Computing Conference, Jul. 4, 2011, pp. 2226-2230, IEEE.

\* cited by examiner

S100
Providing a first control signal to an inverse Fourier transform, IFT, module, the first control signal being configured to cause the IFT module to generate a first time-domain sequence comprising a first set of time-domain samples based on a frequency-domain preamble sequence

S200
Providing a second control signal to interpolation circuitry, the second control signal being configured to cause the interpolation circuitry to generate a second time-domain sequence comprising a second set of time-domain samples based on the first set of time-domain samples, the second set of time-domain samples comprising the first set of time-domain samples and interpolated time-domain samples inserted between the samples of the first set of time-domain samples, the number of time-domain samples in the second set of time-domain samples matching a required number of samples needed for a digital-to-analogue converter, DAC, having a predetermined sampling rate, and provide the second time-domain sequence to the DAC

Fig. 5

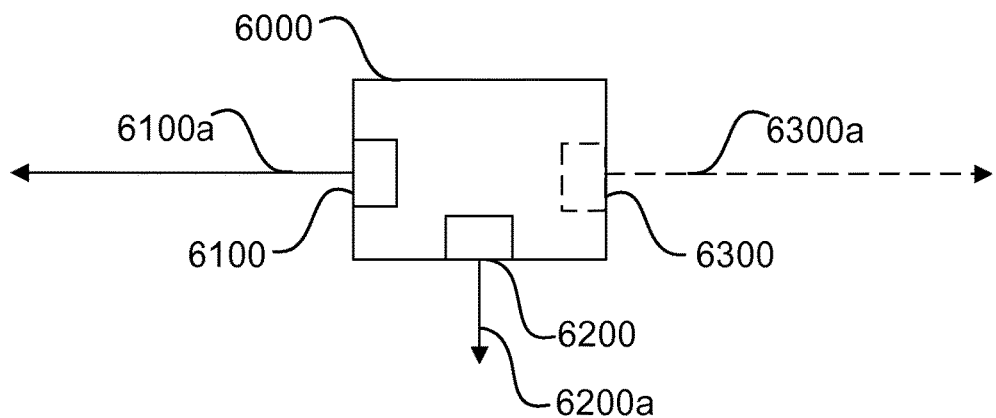

Fig. 6

PHYSICAL RANDOM ACCESS CHANNEL SIGNAL GENERATION OPTIMIZATION FOR 5G NEW RADIO

TECHNICAL FIELD

The present disclosure relates to wireless telecommunications. In particular, the present disclosure relates to methods, computer programs, device and systems for physical random access channel, PRACH, signal generation for 5G new radio, NR.

BACKGROUND

The number of wireless devices are growing rapidly and are projected to be ubiquitous and constantly connected to the cloud. In particular, an increasing range of devices are becoming connected in what is commonly referred to as the internet of things, IoT. When billions of wireless devices with widely varying demands are increasingly getting connected to the cloud, there is demand for a technology which enables, among other things, scalability, flexibility, quality of service and security. 5G has been introduced as the next set of mobile technologies aimed at meeting the ever increasing challenges and demands, and 5G new radio, 5G NR is the new air interface that comes as part of 5G.

Compared to previous communication technologies, 5G NR will be designed to support a wider range of frequencies, from below six gigahertz, GHz, and millimetre wave bands up to hundred GHz.

When a user equipment, UE, wants to access a radio access network, RAN, or switch between base stations, BS, of the RAN, involvement of a physical radio access channel, PRACH, is necessary. PRACH is a crucial channel to establish uplink synchronisation between the BS and the UE, either for initial UE attachment to the RAN or during UE hand-over between neighbouring cells. PRACH is used to carry random access preambles used for initiation of random access procedure.

Different pieces of equipment described herein in relation to 5G may have different names in relation to different standards.

A "user equipment" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements. Another broad term commonly used in place of the term UE is "wireless device".

In other words, it should be understood by the skilled in the art that "user equipment" is a non-limiting term which means any wireless device, terminal, or node capable of receiving in downlink, DL, and transmitting in uplink, UL, (e.g. PDA, laptop, mobile, sensor, fixed relay, mobile relay or even a radio base station, e.g. femto base station).

A base station may alternatively be called a radio node or radio network node or eNodeB, the term(s) comprising in a general sense any node transmitting radio signals used for measurements, e.g., eNodeB, macro/micro/pico base station, home eNodeB, relay, beacon device, or repeater. A base station herein may comprise a radio node operating in one or more frequencies or frequency bands. It may be a radio node capable of carrier aggregation, CA. It may also be a single- or muti-radio access technology, RAT, node. A multi-RAT node may comprise a node with co-located RATs or supporting multi-standard radio, MSR, or a mixed radio node.

The term radio access network relates to a part of a mobile telecommunications network which implements a radio access technology. In other words, the RAN enables communication between the UE and a core network, and in some cases other RANs and/or UEs directly or indirectly communicatively connected to the core network.

A PRACH signal generation is illustrated in relation to FIG. 1. The procedure can be summarised as follows:
i) Select a Zadoff-Chu sequence based on the upper layer parameter inputs (size of 139 or 839 elements).
ii) Apply discrete Fourier transform, DFT, to the selected sequence.
iii) Apply subcarrier mapping (including cyclic shift) to the DFT output sequence.
iv) Apply inverse discrete Fourier transform, IDFT, of the mapped sequence, based on its format (4096 or 24576 elements).
v) Prepend cyclic prefix, CP, to the IDFT output (size of 30720 elements).
vi) Finally, updated the carrier frequency offset, CFO, and direct current offset, DCO, to generate the PRACH signal.

5G NR and some IoT devices with increasing level of miniaturized form factors, require aggressive reductions to the communication power consumption. This requirement is made more stringent for low data-rate and low latency 5G NR. Long term evolution, LTE, networks offer discontinuous reception, DRX, to enable power saving at UE at the cost of increased delay. Each DRX cycle consists of DRX ON and DRX OFF/sleep periods. DRX often requires PRACH to be performed (when synchronisation is lost). Hence, higher power reduction requirements will entail larger DRX cycles, which in turn will increase the frequency of PRACH procedure execution. Therefore, it is crucial to reduce the PRACH procedure power consumption for these scenarios.

SUMMARY

An object of the present disclosure is to provide a methods, devices, systems and computer program products which seeks to mitigate, alleviate, or eliminate one or more of the above-identified deficiencies in the art and disadvantages singly or in any combination and to enable reduced power consumption during PRACH signal generation with respect to the prior art.

The present disclosure proposes adding a PRACH control module configured to control different modules, in particular inverse (fast) Fourier transform, IF(F)T modules, interpolation modules and carrier frequency offset, CFO, and direct current offset, DCO, generators. By doing so, the computationally demanding step (iv) presented in relation to FIG. 1, i.e. the inverse discrete Fourier transform, IDFT, can be replaced by other native IFFT modules.

In particular, the present disclosure relates to a method for physical random access channel, PRACH, signal generation. The method comprises obtaining a first time-domain sequence comprising a first set of time-domain samples. The method further comprises generating a second time-domain sequence comprising a second set of time-domain samples. The second set of time-domain samples comprises the first set of time-domain samples and interpolated time-domain samples inserted between the samples of the first set of time-domain samples. The number of time-domain samples in the second set of time-domain samples matches a required number of samples needed for a digital-to-analogue converter, DAC, having a predetermined sampling rate. The method also comprises providing the second time-domain sequence to the DAC. According to some aspects, the step of generating the second time-domain sequence is performed by interpolation circuitry. The use of interpolation in the disclosed method enables removal of large non-power-of-two IDFT evaluation, or multiple power-of-two IFFT evaluations, from the PRACH generation procedure. The use of interpolation in the disclosed method further enables reduction of the IDFT size to only a native IFFT (power-of-two) size used by other Physical Channels (e.g. 2048 points for Cat0 and above), while using interpolation to achieve the required number of samples at the DAC sampling rate (e.g. 4096 or 24576 @30.72 MHz). In other words, the method provides improvements in complexity reduction (both computational and storage complexity) which ultimately generates a reduction in power consumption. Additionally, the method enables avoiding to have dedicated engines for PRACH signal generation and reuse "native-IFFT" engines, which reduces the utilised area within the chip.

According to some aspects, obtaining the first time-domain sequence comprises generating the first time-domain sequence based on a frequency-domain preamble sequence. Generating the first time-domain sequence enables taking a standard frequency-domain preamble sequence, such as a Zadoff-Chu sequence, as input for the first time-domain sequence. No upstream modifications are thereby necessary to the system in which the method is carried out.

According to some aspects, the number of time-domain samples in the first set of time-domain samples is less than the required number of samples needed for the DAC sampling rate. By having the number of samples in the first set of time-domain samples being lower than the required number of samples needed for the DAC sampling rate, the complexity required of the IFT-module responsible for performing the inverse Fourier transform is thereby reduced, leading to reduction in computational and storage requirements, and thus also power consumption.

According to some aspects, the method further comprises determining a first index of the first time-domain sequence, wherein the first index is configured to define a subset of the first set of time-domain samples comprising the time-domain samples between the first index and a second index corresponding to the last time-domain sample of the first time-domain sequence. Said subset comprises a number of time-domain samples for generation of a number of time-domain samples corresponding to a cyclic prefix of the second time-domain sequence by insertion of interpolated time-domain samples between the samples of said subset. The method further comprises generating a cyclic prefix comprising the determined subset of time-domain samples and interpolated time-domain samples inserted between the samples of the determined subset. The number of time-domain samples in the cyclic prefix comprises a number of samples needed for matching the required number of samples needed for the DAC sampling rate. According to some aspects, the cyclic prefix is generated before the second set of time-domain samples is generated. By feeding IFFT output to interpolation filters in CP-first order avoids having to store the complete interpolated signal in memory in order to read it out in CP-first order.

According to some aspects, the method further comprises appending, to the determined subset of time-domain samples, a set of extra time-domain samples of the first set of time-domain samples which, when having interpolated time-domain samples inserted between the set of extra time domain samples, correspond to a duration of an interpolation filter output transient response. The influence of the transient response can thereby be removed before the PRACH signal reaches the DAC by discarding the time-domain samples corresponding to the transient response.

According to some aspects, the method further comprises updating a phase of the second time-domain sequence based on a carrier frequency offset, CFO, and a direct current offset, DCO. According to some aspects, the step of updating the phase is performed on a real-time basis. The method thereby enables on-the-fly generation of CFO and DCO over the interpolated signal.

The present disclosure further relates to a system for physical random access channel, PRACH, signal generation. The system comprises a digital-to-analogue converter, DAC, having a predetermined sampling rate. The system further comprises an inverse Fourier transform, IFT, module, configured to generate a first time-domain sequence comprising a first set of time-domain samples based on a frequency-domain preamble sequence. The system further comprises interpolation circuitry. The interpolation circuitry comprises a first signal interface configured to obtain the first time-domain sequence. The interpolation circuitry further comprises a second signal interface configured to obtain interpolation control signals. The interpolation control signals are configured to cause the interpolation circuitry to generate a second time-domain sequence comprising a second set of time-domain samples. The second set of time-domain samples comprises the first set of time-domain samples and interpolated time-domain samples inserted between the samples of the first set of time-domain samples. The number of samples in the second set of time-domain samples matches a required number of samples of the DAC sampling rate. The interpolation circuitry also comprises control circuitry configured to generate the second time-domain sequence. The interpolation circuitry additionally comprises a third signal interface configured to provide the second time-domain sequence. The system yet further comprises a PRACH control module. The PRACH control module comprises a first control signal interface configured to provide a first control signal to the IFT module. The first control signal is configured to cause the IFT module to generate the first time-domain sequence. The PRACH control module further comprises a second control signal interface configured to provide a second control signal to the interpolation circuitry. The second control signal is configured to cause the interpolation circuitry to generate the second time-domain sequence. According to some aspects, the IFT module comprises an inverse fast Fourier transform, IFFT, module. The system implements the disclosed method for PRACH signal generation and thus has all the corresponding technical effects and advantages.

The present disclosure also relates to a user equipment, UE, for physical random access channel, PRACH, signal generation. The UE comprises a system for physical random access channel, PRACH, signal generation. The system comprises a digital-to-analogue converter, DAC, having a predetermined sampling rate. The system further comprises an inverse Fourier transform, IFT, module, configured to generate a first time-domain sequence comprising a first set of time-domain samples based on a frequency-domain preamble sequence. The system further comprises interpolation circuitry. The interpolation circuitry comprises a first signal interface configured to obtain the first time-domain sequence. The interpolation circuitry further comprises a second signal interface configured to obtain interpolation control signals. The interpolation control signals are configured to cause the interpolation circuitry to generate a second time-domain sequence comprising a second set of time-domain samples. The second set of time-domain samples comprises the first set of time-domain samples and interpolated time-domain samples inserted between the samples of the first set of time-domain samples. The number of samples in the second set of time-domain samples matches a required number of samples of the DAC sampling rate. The interpolation circuitry also comprises control circuitry configured to generate the second time-domain sequence. The interpolation circuitry additionally comprises a third signal interface configured to provide the second time-domain sequence. The system yet further comprises a PRACH control module. The PRACH control module comprises a first control signal interface configured to provide a first control signal to the IFT module. The first control signal is configured to cause the IFT module to generate the first time-domain sequence. The PRACH control module further comprises a second control signal interface configured to provide a second control signal to the interpolation circuitry. The second control signal is configured to cause the interpolation circuitry to generate the second time-domain sequence. The UE further comprises a radio antenna configured to transmit and receive radio signals. The UE thereby implements the disclosed method for PRACH signal generation and consequently has all the associated technical effects and advantages.

The present disclosure further relates to interpolation circuitry for physical random access channel, PRACH, signal generation. The interpolation circuitry comprises a first signal interface configured to obtain a first time-domain sequence comprising a first set of time-domain samples. The interpolation circuitry further comprises a second signal interface configured to obtain interpolation control signals. The interpolation control signals are configured to cause the interpolation circuitry to generate a second time-domain sequence comprising a second set of time-domain samples. The second set of time-domain samples comprises the first set of time-domain samples and interpolated time-domain samples inserted between the samples of the first set of time-domain samples. The number of samples in the second set of time-domain samples matches a required number of samples of a digital-to-analogue converter, DAC, having a predetermined sampling rate. The interpolation circuitry also comprises control circuitry configured to generate the second time-domain sequence. The interpolation circuitry yet further comprises a third signal interface configured to provide the second time-domain sequence to the DAC. The interpolation circuitry thereby enables removal of large non-power-of-two IDFT evaluation, or multiple power-of-two IFFT evaluations, from the PRACH generation procedure. The method further enables reduction of the IDFT size to only a native IFFT (power-of-two) size used by other Physical Channels (e.g. 2048 points for Cat0 and above), while using interpolation to achieve the required number of samples at the DAC sampling rate (e.g. 4096 or 24576 @30.72 MHz). In other words, the interpolation circuitry enables improvements in complexity reduction (both computational and storage complexity) which ultimately generates a reduction in power consumption. Additionally, the interpolation circuitry enables avoiding to have dedicated engines for PRACH signal generation and reuse "native-IFFT" engines, which reduces the utilised area within the chip.

The present disclosure further relates to a method, performed in a physical random access channel, PRACH, control module, CM, for PRACH signal generation. The method comprises providing a first control signal to an inverse Fourier transform, IFT, module. The first control signal is configured to cause the IFT-module to generate a first time-domain sequence comprising a first set of time-domain samples based on a frequency-domain preamble sequence. The method further comprises providing a second control signal to interpolation circuitry. The second control signal is configured to cause the interpolation circuitry to generate a second time-domain sequence comprising a second set of time-domain samples based on the first set of time-domain samples. The second set of time-domain samples comprises the first set of time-domain samples and interpolated time-domain samples inserted between the samples of the first set of time-domain samples. The number of time-domain samples in the second set of time-domain samples matches a required number of samples needed for a digital-to-analogue converter, DAC, having a predetermined sampling rate. The second control signal is also configured to cause the interpolation circuitry to provide the second time-domain sequence to the DAC. The method provides coordination, by means of control signals, between modules and circuitry of the disclosed system for PRACH signal generation to carry out the associated method for PRACH signal generation. The method performed in the PRACH-CM therefore has all the same technical effects and advantages.

The present disclosure also relates to a physical random access channel, PRACH, control module, CM, for PRACH signal generation. The PRACH-CM comprises a first control signal interface configured to provide a first control signal to an inverse Fourier transform, IFT, module. The first control signal being configured to cause the IFT module to generate a first time-domain sequence comprising a first set of time-domain samples based on a frequency-domain preamble sequence. The PRACH-CM further comprises a second control signal interface configured to provide a second control signal to an interpolation circuitry. The second control signal is configured to cause the interpolation circuitry to generate a second time-domain sequence comprising a second set of time-domain samples based on the first set of time-domain samples.

The second set of time-domain samples comprises the first set of time-domain samples and interpolated time-domain samples inserted between the samples of the first set of time-domain samples. The number of time-domain samples in the second set of time-domain samples matches a required number of samples needed for a digital-to-analogue converter, DAC, having a predetermined sampling rate. The second control signal is further configured to cause the interpolation circuitry to provide the second time-domain sequence to the DAC. The PRACH-CM is thereby configured to carry out the method, performed in PRACH-CM, for PRACH signal generation, as described above and below, and consequently has all the associated technical effects and advantages.

The present disclosure yet further relates to a computer program product comprising a non-transitory computer readable medium, having thereon a computer program comprising program instructions. The computer program is loadable into a data processing unit and configured to cause execution of any of the disclosed methods. The computer program product consequently has all the technical effects and advantages of the method(s) it implements.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 5 illustrates method steps performed in a PRACH control module;

FIG. 6 illustrates a PRACH control module according to the present disclosure;

DETAILED DESCRIPTION

Figure 1:
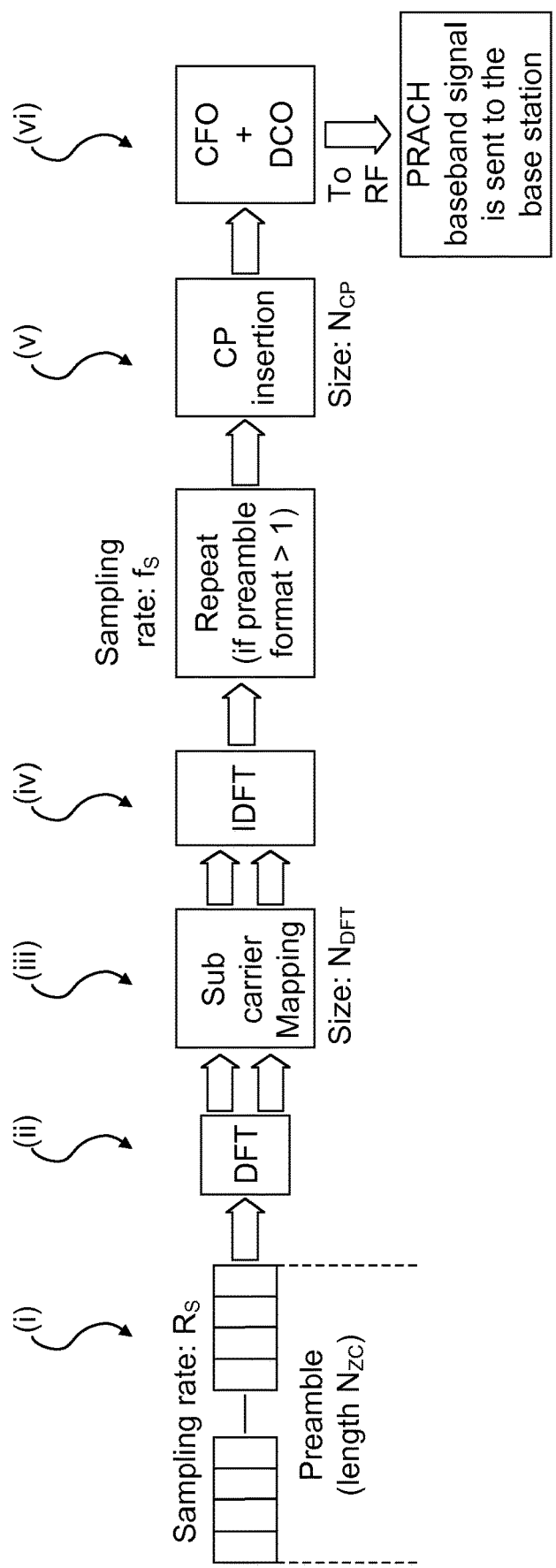
FIG. 1 illustrates a flow diagram of PRACH signal generation according to the prior art.

Aspects of the present disclosure will be described more fully hereinafter with reference to the accompanying drawings. The methods, devices, systems and computer program products disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Figure 2A:
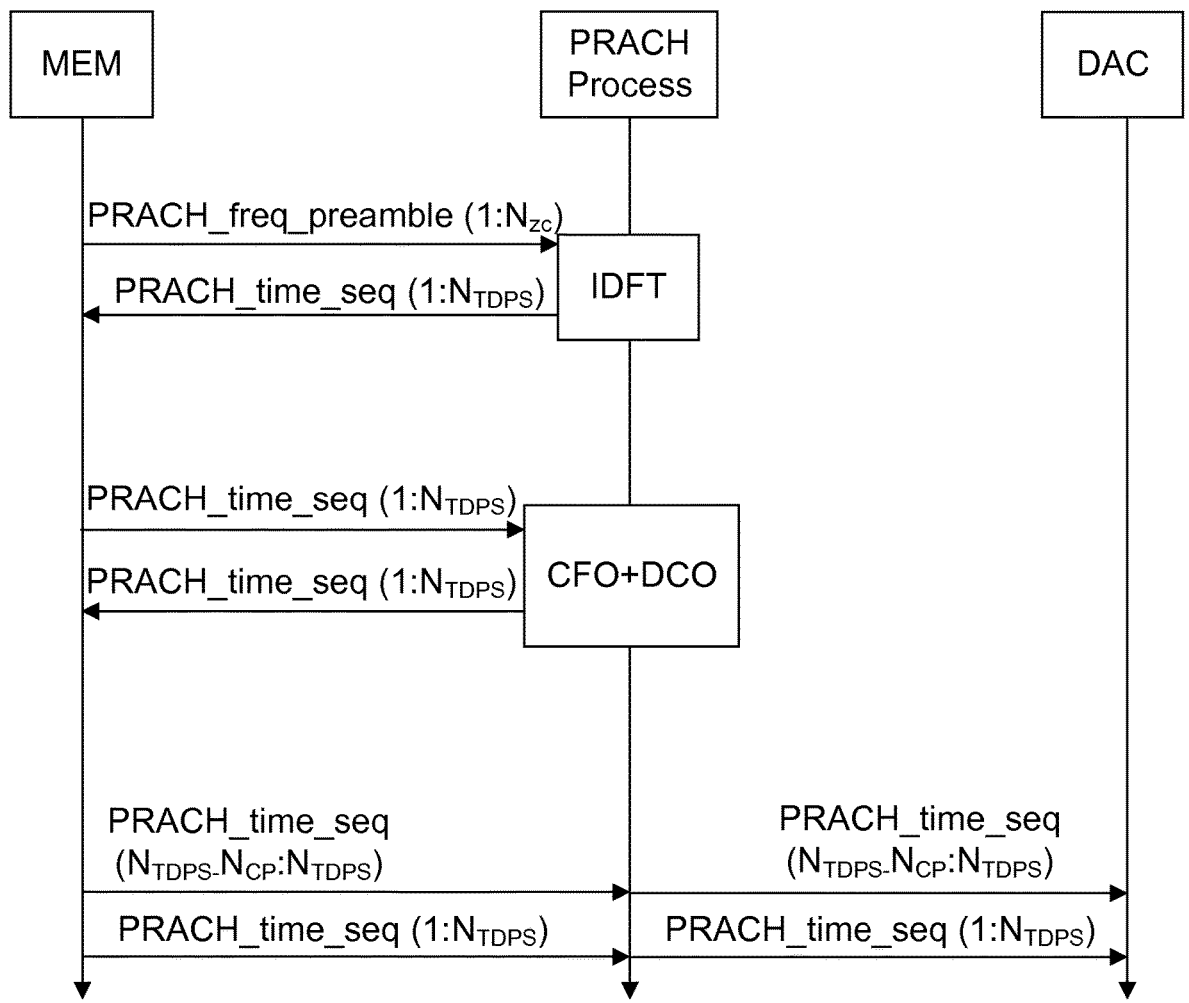
FIGS. 2a and 2b illustrate signalling diagrams comparing the prior art with the disclosed method.
Figure 2B:
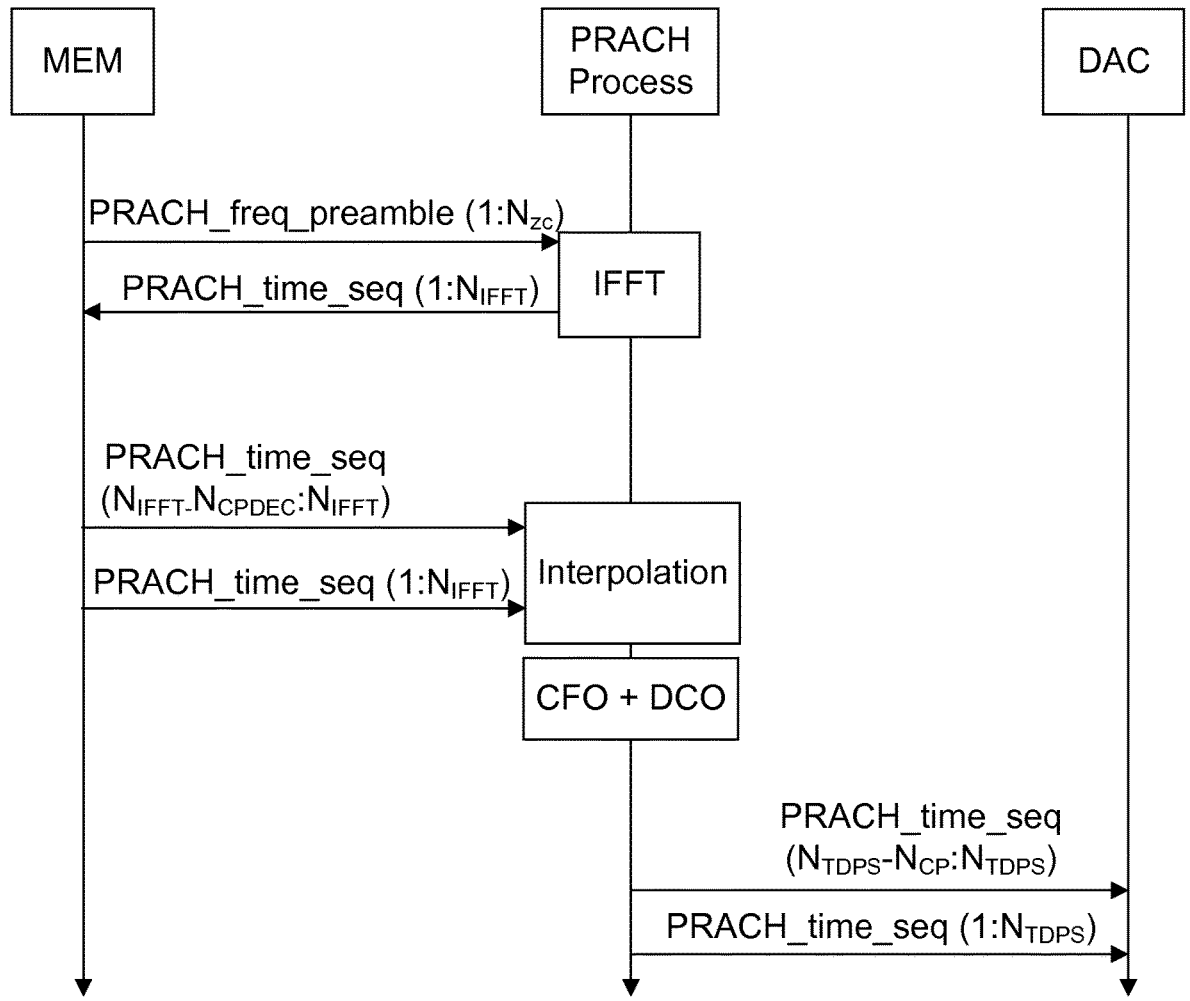

FIGS. 2a and 2b illustrate signalling diagrams comparing the prior art with the disclosed method. In both the prior art and the illustrated example of the disclosed method, a PRACH frequency preamble PRACH_freq_preamble, here in the form of a Zaduff-Chu sequence, is obtained from memory MEM. The Zadoff-Chu sequence comprises a set of frequency-domain samples. The sequence is an ordered set of length $N_{ZC}$. Each frequency-domain sample is here assigned an index, running from 1 to $N_{ZC}$. In the prior art, see FIG. 2a, the PRACH frequency preamble is obtained by an inverse discrete Fourier transform module, IDFT, for transforming the frequency-domain samples to a set of time-domain samples.

In the prior art, the IDFT is configured to output a first time-domain sequence comprising a set of time-domain samples matching a required number of samples needed for a digital-to-analogue converter, DAC, having a predetermined sampling rate. The IDFT is an engine which is dedicated to PRACH signal generation only. By matching is meant that the time-domain sequence provided to the DAC has the required number of samples at the DAC sampling rate (e.g. 4096 or 24576 time-domain samples at a 30.72 MHz DAC sampling rate). In other words, in the prior art, the IDFT immediately outputs a time-domain sequence of the same length as that intended for the DAC. In this example, the number of time-dependent samples of the final time-domain sequence intended for the DAC is $N_{TDPS}$.

However, in FIG. 2b the IDFT is replaced by an inverse Fourier transform module, IFT, e.g. an inverse fast Fourier transform module, IFFT, as in the present example, wherein the IFFT module is configured to generate a number of time-domain samples $N_{IFFT}$ in a first set of time-domain samples that is less than the required number of samples needed for the DAC sampling rate. The memory requirement of the memory MEM is thereby reduced by the ratio $N_{TDPS}/N_{IFFT}$. We can thus see that large non-power-of-two IDFT evaluation, or multiple power-of-two IFFT evaluations, are removed from the PRACH generation procedure. Furthermore, reduction of the IDFT size to only a native IFFT (power-of-two) size used by other Physical Channels means that other procedures that utilise IFFT can reuse this module/engine. For instance, NR PRACH and PUSCH are overlapped and having the same IFFT engine will bring benefits of engine reusing.

In the prior art, see FIG. 2a, the full time-domain sequence is read from memory MEM and carrier frequency offset, CFO, and direct current offset, DCO, are applied to the time-domain sequence. The updated time-domain sequence is then stored in the memory MEM. The time-domain sequence is subsequently read partially from the memory in order to generate a cyclic prefix. The cyclic prefix and the full time-domain sequence is finally transmitted to the DAC. The time-domain sequence has thus been read to/from memory an additional three times plus the subset needed to generate the cyclic prefix; this should be compared to the demands placed in the illustrative example in FIG. 2b, as described further below.

The PRACH generation process, as described in FIG. 2b, introduces interpolation circuitry which takes the first time-domain sequence as input and inserts interpolated time-domain samples between the samples of the first time-domain sequence. The result is a second time-domain sequence comprising the time-domain samples of the first time-domain sequence with interpolated time-domain samples in-between. It should be noted that the second time-domain sequence does not have to be separate from the first time-domain sequence, but may be an amendment of the first time-domain sequence. A subset, from index $N_{IFFT}-N_{CPDEC}$ to $N_{IFFT}$, of the time-domain samples of the first time-domain sequence is also interpolated to generate a cyclic prefix, CP, for the second time-domain sequence. The use of the interpolation circuitry thereby enables avoiding further use of the memory MEM, which saves a considerable amount of power with respect to the prior art, here by eliminating further read/write from/to the memory MEM. It should further be noticed that by feeding the time-domain samples into the interpolation circuitry in CP-first order enables switching the sequence of when the CFO and DCO is applied; CFO and DCO can thereby be applied in real time, i.e. on-the-fly, as time-domain samples are fed from the interpolation circuitry. The resulting CP and PRACH sequence can be directly provided to the DAC without passing via the memory. In summary, the interpolation circuitry enables a considerable reduction in the amount of data that has to be read to/from the memory, both in absolute storage ($N_{IFFT}$ vs $N_{TDPS}$) as well as the number of times time-domain samples are stored and obtained by the PRACH process circuitry.

These differences as well as their technical effects and advantages will be further illustrated in relation to FIG. 3 below.

Figure 3:
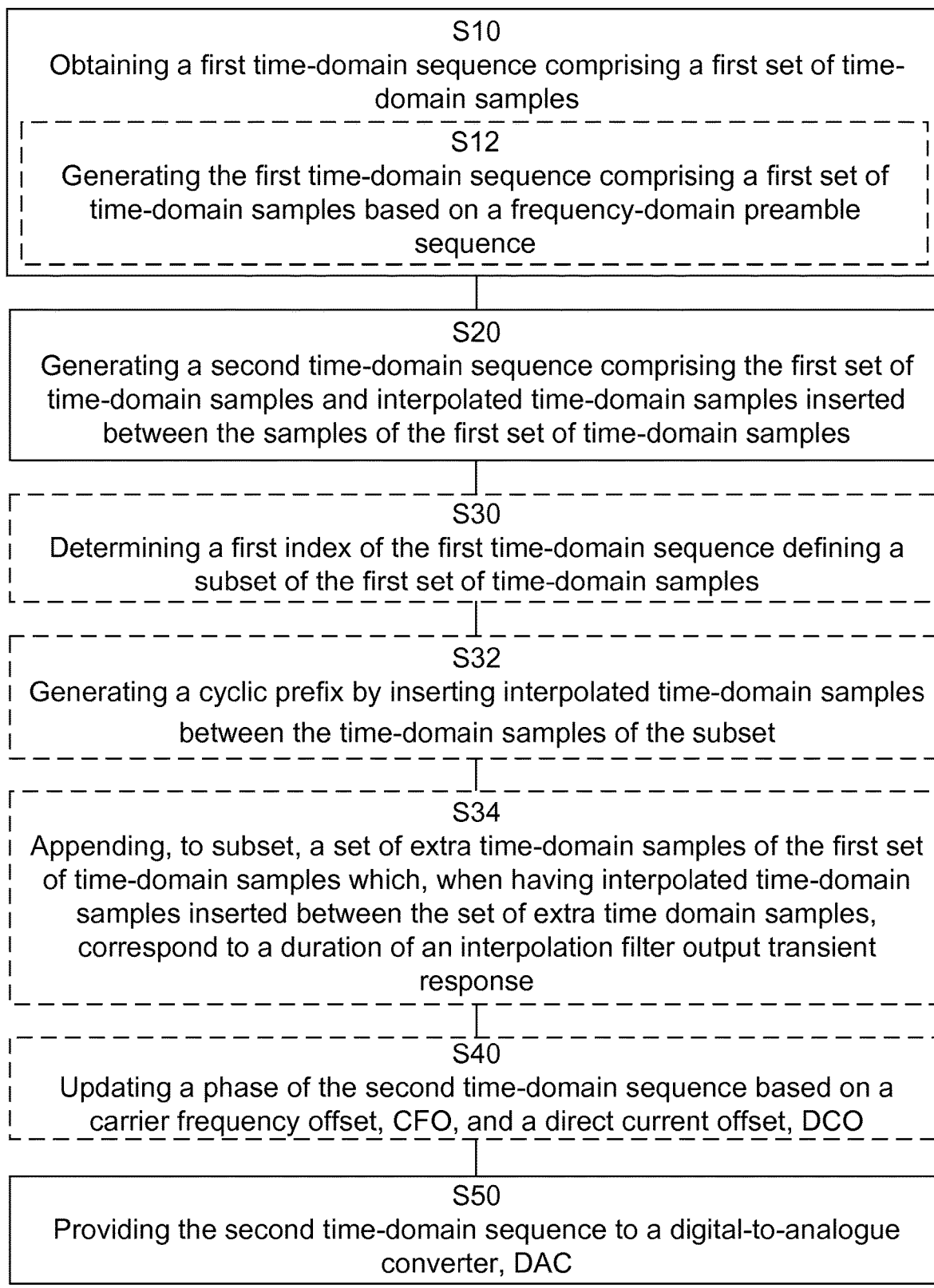
FIG. 3 illustrates method steps of the disclosed method.
Figure 10:
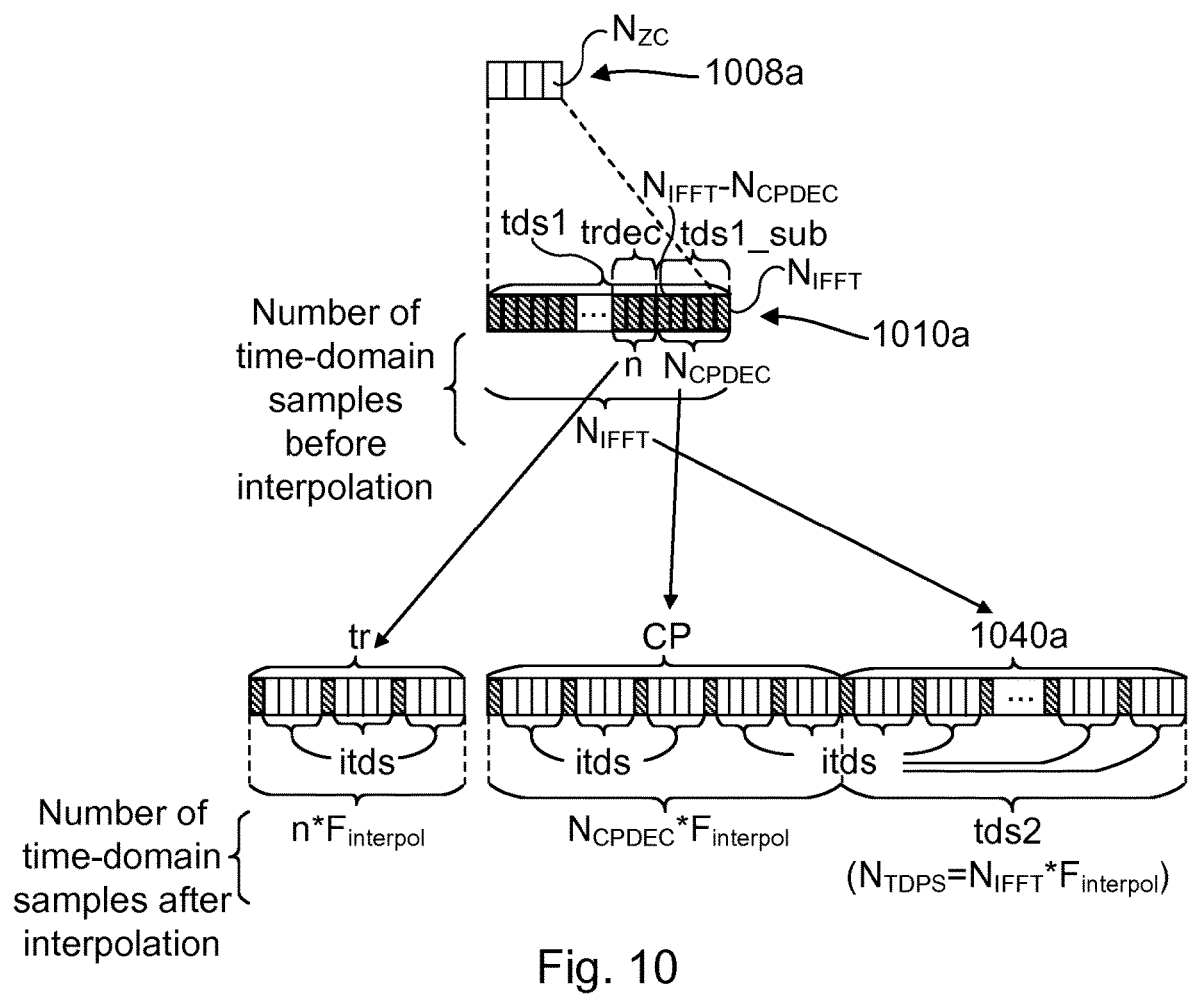
FIG. 10 illustrates the frequency- and time-domain sequences generated by the disclosed method.

FIG. 3 illustrates method steps of a method for physical random access channel, PRACH, signal generation. Reference will also be given to FIG. 10, where the frequency- and time-domain sequences generated at various stages of the disclosed method are illustrated. The method comprises obtaining S10 a first time-domain sequence 1010a comprising a first set of time-domain samples tds1. The first time-domain sequence 1010a is typically obtained based on a frequency-domain preamble sequence 1008a, such as a Zadoff-Chu sequence. Table 1 below illustrates examples of parameter values relevant in the context of 5G NR for the disclosed method. While Table 1 illustrates the parameters for the disclosed method for Zadoff-Chu sequences of length 139 and 839, respectively, the disclosed method is applicable for any length of the Zadoff-Chu sequences. In other words, the disclosed method is applicable to other radio communication technologies besides 5G NR, such as internet of things, IoT, and long term evolution, LTE.

TABLE 1

PRACH generation parameters and method parameters.

| PRACH generation parameters | $N_{ZC}$ | 139 | | 839 | | |
|---|---|---|---|---|---|---|
| | $N_{TDPS}$ | 4096 | | 24576 | | 49152 |
| | $N_{CP}$ | 448 | 3168 | 21024 | 6240 | 21024 |
| Method parameters | $N_{IFFT}$ | 128 | 512 | 1024 | 2048 | etc. |
| | $F_{interpol} = N_{TDPS}/N_{IFFT}$ | | | | | |
| | $N_{CPDEC}$ | | | | | |

From Table 1 it can be seen that Zadoff-Chu sequences of length 139 or 839, which in the prior art would normally be immediately transformed to a time-domain sequence of length 4096, 24576 or 49152 here will be inverse Fourier transformed to a time-domain sequence of length $N_{IFFT}$. As illustrated previously in relation to FIG. 2b, only the first time-domain sequence of length $N_{IFFT}$ (i.e. of length 128, 512, 1024, etc.) needs to be stored in memory.

Based on the parameters of Table 1, a second time-domain sequence for the PRACH signal bode can be generated by means of interpolation of the first time-domain sequence. The parameters of Table 1 are not limiting for the disclosed method, but only provided to facilitate understanding of the disclosed method. In other words, the method further comprises generating S20 a second time-domain sequence 1040a comprising a second set of time-domain samples tds2. The second set of time-domain samples tds2 comprising the first set of time-domain samples tds1 and interpolated time-domain samples itds inserted between the samples of the first set of time-domain samples tds1. In FIG. 10, the time-domain samples of the first time-domain sequence are highlighted by diagonal stripes. The number of time-domain samples $N_{TDPS}$ in the second set of time-domain samples tds2 matches a required number of samples needed for a digital-to-analogue converter, DAC, having a predetermined sampling rate. According to some aspects, the step of generating S20 the second time-domain sequence is performed by interpolation circuitry.

For instance, from Table 1 it can be seen that a Zadoff-Chu sequence length of 139, i.e. 139 frequency-domain samples, inverse Fourier transformed to a first time-domain sequence length of 128, i.e. 128 time-domain samples, requires 4096 time-domain samples. This corresponds to an interpolation factor of $F_{interpol} = N_{TDPS}/N_{IFFT} = 4096/128 = 32$. In other words, in this example, 31 time-domain samples would need to be interpolated for each time-domain sample in the first time-domain sequence 1010a.

It should be noted that the second time-domain sequence 1040a does not need to be a time-domain sequence separate from the first; the second time-domain sequence may be the result of amending the first time-domain sequence by insertion of the interpolated time-domain samples itds.

As stated previously in relation to FIG. 2b, a main technical effect of using interpolation is that the first time-domain sequence may be arranged to comprise fewer time-domain samples than needed for the DAC, which both removes the need for a dedicated IFT-module and reduces the need to read time-domain samples to/from memory. In other words, according to some aspects, the number of time-domain samples $N_{IFFT}$ in the first set of time-domain samples is less than the required number of samples needed for the DAC sampling rate.

Once the second time-domain sequence is generated, it needs to be provided to the DAC. Thus, the method also comprises providing S50 the second time-domain sequence 1040a to the DAC.

In addition to the PRACH message body, the PRACH signal will also need a cyclic prefix, CP. The CP may be generated as follows. A first index $N_{IFFT}-N_{CPDEC}$ of the first time-domain sequence 1010a may be determined S30. The first index $N_{IFFT}-N_{CPDEC}$ is configured to define a subset of the first set of time-domain samples tds1_sub comprising the time-domain samples between the first index $N_{IFFT}-N_{CPDEC}$ and a second index $N_{IFFT}$ corresponding to the last time-domain sample of the first time-domain sequence 1010a, wherein said subset tds1_sub comprises a number of time-domain samples $N_{CPDEC}$ for generation of a number of time-domain samples corresponding to a cyclic prefix of the second time-domain sequence 1040a by insertion of interpolated time-domain samples itds between the samples of said subset tds1_sub.

In other words, a subset of time-domain samples of length $N_{CPDEC}$ is chosen at the end of the first time-domain sequence. When the chosen subset is interpolated in the same manner as the entire first time-domain sequence when generating the PRACH message body, a cyclic prefix for the second time-domain sequence is obtained.

Thus, the method further comprises generating S32 a CP comprising the determined subset of time-domain samples tds1_sub and interpolated time-domain samples itds inserted between the samples of the determined subset tds1_sub, the number of time-domain samples in the cyclic prefix CP comprising a number of samples needed for matching the required number of samples needed for the DAC sampling rate. In other words, the CP will comprise $F_{interpol}*N_{CPDEC}$ time-domain samples.

According to some aspects, the cyclic prefix is generated S32 before the second set of time-domain samples tds2 is generated S20. By feeding IFFT output to interpolation filters in CP-first order, storage of the complete interpolated PRACH signal in memory can be avoided and the interpolated PRACH signal can be read out in CP-first order.

According to some aspects, the method further comprises updating S40 a phase of the second time-domain sequence stds based on a carrier frequency offset, CFO, and a direct current offset, DCO. When the cyclic prefix is generated S32 before the second set of time-domain samples is generated S20, and the interpolated PRACH signal is read out in CP-first order, the step of updating S40 the phase may be performed on a real-time basis, i.e. on-the-fly.

The interpolation filters performing the interpolation may have a time period where the interpolation filters has an output different from a desired steady-state output known as the filters' transient response. Performing interpolation during the transient response is undesirable as it may perturb the interpolated time-domain samples beyond a desirable tolerance level. Therefore, according to some aspects, the method further comprises appending S34, to the determined subset of time-domain samples tds1_sub, a set of extra time-domain samples trdec of the first set of time-domain samples tds1 which, when having interpolated time-domain samples itds inserted between the set of extra time domain samples trdec, correspond to a duration of an interpolation filter output transient response tr. In other words, a set of time-domain samples is added to the PRACH-signal corresponding to the duration of the transient response. These added samples can then be removed before the generated PRACH-signal is provided to the DAC.

The transient response of the interpolation filters will typically be known in advance of operational use. Therefore, when generating the cyclic prefix in the CP-first manner described above, an additional n number of time-domain samples can be read from the first time-domain sequence in addition to the $N_{CPDEC}$ time-domain samples needed to interpolate to a complete cyclic prefix. The additional n number of time-domain samples will, when interpolated during the generation of the CP, result in an interpolated set of time-domain samples comprising $n*N_{interpol}$ time-domain samples corresponding to a duration of the transient response.

A complexity analysis comparing the disclosed method to some methods of the prior art can be found in Table 2 below, which further illustrates the technical effects and advantages of the disclosed method. In addition to the prior art discussed in relation to FIG. 1 and FIG. 2a, here referred to as "Baseline", complexity analysis will also be performed in relation to Ref 1: He, Ying, et al. "An efficient implementation of PRACH generator in LTE UE transmitters." 2011 7th International Wireless Communications and Mobile Computing Conference. IEEE, 2011, and Ref 2: US2015139238 "Multi-tenant Isolation In A Cloud Environment Using Software Defined Networking".

TABLE 2

Complexity comparison of PRACH sequence generation of the disclosed method vs methods of the prior art.

| PRACH Procedure | Memory Storage [KB] | Memory Access Write | Memory Access Read | Equivalent Complexity [number of additions] |
|---|---|---|---|---|
| Baseline | $\frac{2 \cdot N_{TDPS} \cdot W}{8 \cdot 1024}$ | $N_{TDPS}$ | $N_{TDPS} + N_{CP}$ | $O(IDFT)$ |
| Ref 1 | $\frac{2 \cdot N_{TDPS} \cdot W}{8 \cdot 1024}$ | $N_{TDPS}$ | $2 \cdot N_{TDPS} + N_{CP}$ | $N_{GIFFT} \cdot O(IFFT)$ |
| Ref 2 | $\frac{2 \cdot N_{IDFT} \cdot W}{8 \cdot 1024}$ | $N_{IDFT}$ | $N_{IDFT} + N_{CPDEC}$ | $O(IDFT1) + O(FIR_M)$ |
| The disclosed method | $\frac{2 \cdot N_{IFFT} \cdot W}{8 \cdot 1024}$ | $N_{IFFT}$ | $N_{IFFT} + N_{CPDEC}$ | $O(IFFT) + O(FIR_M)$ |

Notation of Table 2:
$N_{ZC}$=Zadoff-Chu sequence length (utilised in the baseline method),
$N_{IFFT}$=size of the "native" IFFT (utilised in the disclosed method and in Ref 1),
$N_{IDFT}$=size of the IDFT utilised in Ref 2,
$N_{TDPS}$=size of the time-domain PRACH sequence (utilised in the baseline and in Ref 1),
$N_{CPDEC}$=decimated cyclic prefix length (utilised in the disclosed method),
$N_{GIFFT}$=number of IFFT groups→$N_{TDPS}/N_{IFFT}$ (utilised in Ref 1),
$M_{FIR}$=number of filter-taps in the interpolation chain (utilised in the disclosed method),
W=bit-width precision I/Q (utilised in all the methods of Table 2), and wherein $O(\text{IDFT}) = N_{TDPS} \cdot N_{ZC} \cdot O(\text{IDFT1})$, $O(IFFT) = \log_2(N_{IFFT}) \cdot \left[ \frac{N_{IFFT}}{2} \cdot O(IFFT2) \right]$, $O(\text{FIR}_M) = (N_{TDPS} - M_{FIR} - 1) \cdot O(\text{FIR1})$, and $O(\text{IDFT1}) = N_{IDFT} \cdot N_{ZC} \cdot O(\text{IDFT1})$.

In terms of computational complexity, the following considerations have been taken:
Single IDFT radix 2
$O(\text{IDFT1}) = \Sigma x(k)e^{j2\pi nk}$,
i.e. $O(\text{IDFT1}) = (9+4W)$ add
Single IFFT radix 2 with multiplication reduction, i.e. $O(\text{IFFT2}) = 3\text{mul} + 4\text{add} = (3*W)\text{add} + 5\text{add} + 4\text{add} = 3(W+3)\text{add}$ Single FIR symmetric $O(\text{FIR1}) = (2(M_{FIR}-1))\text{add} + (2\text{ceiling}(M_{FIR}/2))\text{constMul} = (2(M_{FIR}-1))\text{add} + \text{ceiling}(M_{FIR}/2)W)\text{add}$.

A multiplication is considered as W add and a constant multiplication as W/2 add. In the $O(\text{IDFT}_1)$, the factor (j2πnk) is considered as an accumulator.

By inserting typical numbers in Table 2, it can be shown that in some scenarios improvements of both ~10× in storage reduction, ~10× in memory accesses, and up to ~1.4 and ~200× in complexity reduction can be achieved, respectively. Thus, enabling a significant reduction dynamic and static power consumption. On the other hand, comparing against Ref 2, the memory access is relatively comparable but the main difference is that the proposal utilises a native IFFT size engine, which can be reused for other processes such as PUSCH generation and additionally, Ref 2 utilises an IDFT with a fixed size and dedicated only to PRACH procedure, which requires a corresponding chip area. Regarding complexity reduction, the proposal outperforms Ref 2 in about ~1.1×, which impacts the power consumption as it has been mentioned. It is worth noting that the proposal complexity can be reduced with an optimised filtering stage.

The disclosed method is applicable for any "native" IFFT size, i.e. the size of any IFFT already present for another purpose than PRACH signal generation, and any type of multi-rate interpolation chain (e.g. multi-stage, CIC based, FIR based, IIR based, fractional, integral, etc.).

Figure 4:
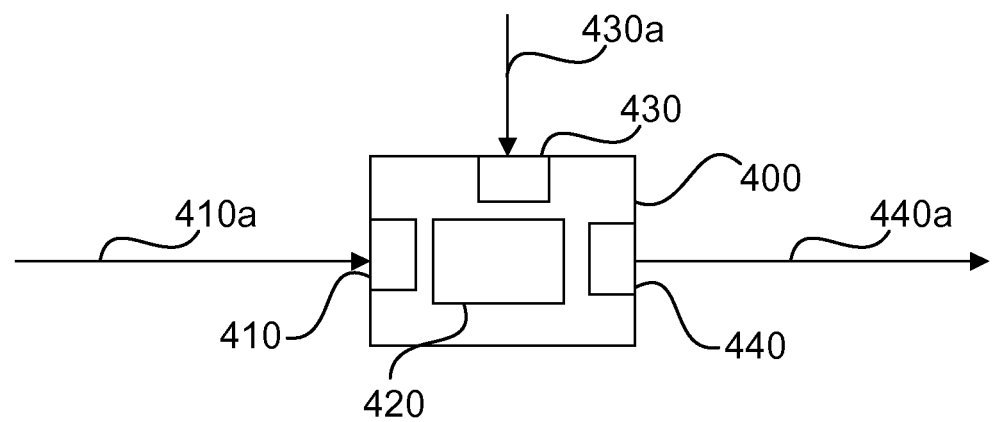
FIG. 4 illustrates interpolation circuitry according to the present disclosure.

FIGS. 4-6 will illustrate two of the main components of the present disclosure—an interpolation circuitry and a PRACH control module. The interpolation circuitry will be responsible for performing the interpolation of time-domain sequences so that they will have the required number of time-domain samples when being provided to the DAC. The PRACH control module will coordinate the interpolation circuitry with other components of the system configured to generate the PRACH signals.

FIG. 4 illustrates Interpolation circuitry 400 for physical random access channel, PRACH, signal generation. The interpolation circuitry 400 comprises a first signal interface 410 configured to obtain a first time-domain sequence 410a comprising a first set of time-domain samples tds1. The interpolation circuitry 400 further comprises a second signal interface 430 configured to obtain interpolation control signals 430a. The interpolation control signals are configured to cause the interpolation circuitry 400 to generate a second time-domain sequence 440a comprising a second set of time-domain samples tds2. The second set of time-domain samples tds2 comprising the first set of time-domain samples tds1 and interpolated time-domain samples itds inserted between the samples of the first set of time-domain samples tds1. The number of samples in the second set of time-domain samples $N_{TDPS}$ matches a required number of samples of a digital-to-analogue converter, DAC, having a predetermined sampling rate. The interpolation circuitry also comprises control circuitry 420 configured to generate the second time-domain sequence 440a. The interpolation circuitry further comprises a third signal interface 440 configured to provide the second time-domain sequence 440a to the DAC.

The interpolation circuitry enables removal of large non-power-of-two IDFT evaluation, or multiple power-of-two IFFT evaluations, from the PRACH generation procedure. The method further enables reduction of the IDFT size to only a native IFFT (power-of-two) size used by other Physical Channels (e.g. 2048 points for Cat0 and above), while using interpolation to achieve the required number of samples at the DAC sampling rate (e.g. 4096 or 24576 @30.72 MHz). In other words, the interpolation circuitry enables improvements in complexity reduction (both computational and storage complexity) which ultimately generates a reduction in power consumption. Additionally, the interpolation circuitry enables avoiding to have dedicated engines for PRACH signal generation and reuse "native-IFFT" engines, which reduces the utilised area within the chip.

FIG. 5 illustrates a method, performed in a physical random access channel, PRACH, control module, CM, for PRACH signal generation. The method comprises providing S100 a first control signal to an inverse Fourier transform, IFT, module, e.g. an inverse fast Fourier transform, IFFT, module. The first control signal is configured to cause the IFT-module to generate a first time-domain sequence comprising a first set of time-domain samples based on a frequency-domain preamble sequence.

The method further comprises providing S200 a second control signal to interpolation circuitry. The second control signal is configured to cause the interpolation circuitry to generate a second time-domain sequence comprising a second set of time-domain samples based on the first set of time-domain samples. The second set of time-domain samples comprises the first set of time-domain samples and interpolated time-domain samples inserted between the samples of the first set of time-domain samples. The number of time-domain samples in the second set of time-domain samples matches a required number of samples needed for a digital-to-analogue converter, DAC, having a predetermined sampling rate. The second control signal is further configured to cause the interpolation circuitry to provide the second time-domain sequence to the DAC.

As stated above, the method provides coordination, by means of control signals, between modules and circuitry of the disclosed system for PRACH signal generation to carry out the associated method for PRACH signal generation.

FIG. 6 illustrates a physical random access channel, PRACH, control module, CM, 6000 for PRACH signal generation. The PRACH-CM comprises a first control signal interface 6100 configured to provide a first control signal 6100a to an inverse Fourier transform, IFT, module. The first control signal is configured to cause the IFT module to generate a first time-domain sequence comprising a first set of time-domain samples based on a frequency-domain preamble sequence. The PRACH-CM further comprises a second control signal interface 6200 configured to provide a second control signal 6200a to an interpolation circuitry. The second control signal is configured to cause the interpolation circuitry to generate a second time-domain sequence comprising a second set of time-domain samples based on the first set of time-domain samples. The second set of time-domain samples comprises the first set of time-domain samples and interpolated time-domain samples inserted between the samples of the first set of time-domain samples. The number of time-domain samples in the second set of time-domain samples matches a required number of samples needed for a digital-to-analogue converter, DAC, having a predetermined sampling rate. The second control signal is further configured to cause the interpolation circuitry to provide the second time-domain sequence to the DAC.

The PRACH-CM is thereby configured to carry out the method, performed in PRACH-CM, for PRACH signal generation, as described above, e.g. in relation to FIG. 5, and consequently has all the associated technical effects and advantages.

Figure 7:
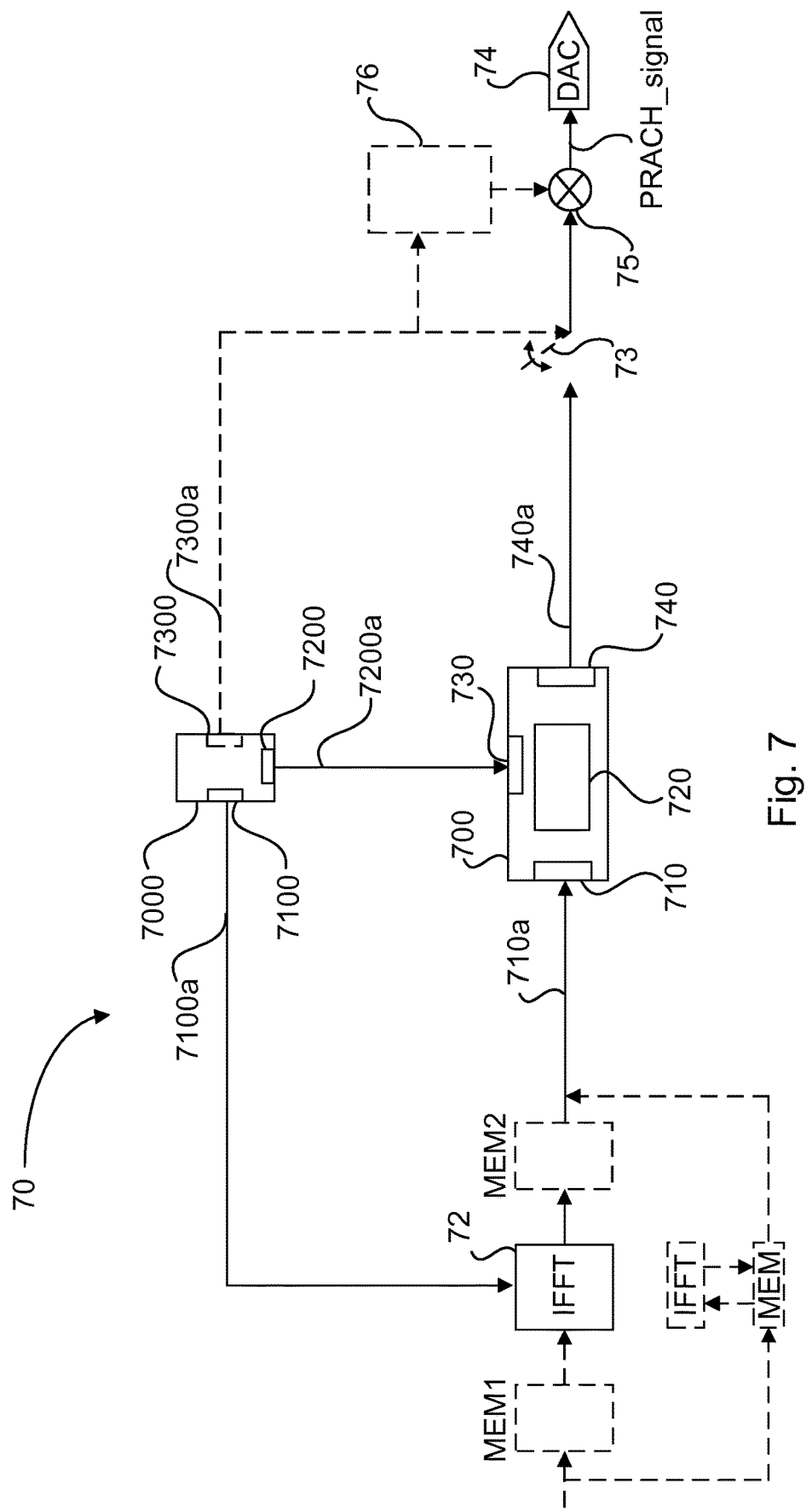
FIG. 7 illustrates a system for PRACH signal generation according to the present disclosure.

FIG. 7 illustrates a system 70 for physical random access channel, PRACH, signal generation. The system comprising a digital-to-analogue converter, DAC, 74 having a predetermined sampling rate. Reference is also given to FIG. 10 which illustrate relationships between different sequences and sample-sets.

The system further comprises an inverse Fourier transform, IFT, module, 72 configured to generate a first time-domain sequence 710a comprising a first set of time-domain samples tds1 based on a frequency-domain preamble sequence 1008a. According to some aspects, the IFT module 72 comprises an inverse fast Fourier transform, IFFT, module.

The system 70 also comprises interpolation circuitry 700. The interpolation circuitry comprises a first signal interface 710 configured to obtain the first time-domain sequence 710a, 1010a.

The interpolation circuitry further comprises a second signal interface 730 configured to obtain interpolation control signals 730a. The interpolation control signals are configured to cause the interpolation circuitry 700 to generate a second time-domain sequence 740a, 1040a comprising a second set of time-domain samples tds2. The second set of time-domain samples tds2 comprises the first set of time-domain samples tds1 and interpolated time-domain samples itds inserted between the samples of the first set of time-domain samples. The number of samples $N_{TDPS}$ in the second set of time-domain samples tds2 matching a required number of samples of the DAC sampling rate.

The interpolation circuitry also comprises control circuitry 720 configured to generate the second time-domain sequence 740a, 1040a.

The interpolation circuitry additionally comprises a third signal interface 740 configured to provide the second time-domain sequence 740a, 1040a to the DAC 74.

The system 70 further comprises a PRACH control module 7000 comprises a first control signal interface 7100 configured to provide a first control signal 7100a to the IFT module 72. The first control signal is configured to cause the IFT module 72 to generate the first time-domain sequence 710a, 1010a.

The PRACH control module further comprises a second control signal interface 7200 configured to provide a second control signal 7200a to the interpolation circuitry 700. The second control signal is configured to cause the interpolation circuitry 700 to generate the second time-domain sequence 740a, 1040a. The second control signal is configured to cause the interpolation circuitry 700 to provide the second time-domain sequence 740a, 1040a to the DAC 74.

The system 70 is thereby configured to carry out the method as described in relation to FIGS. 2b, 3 and 5.

Implementation details involving optional features and configurations will be described further below in order to facilitate understanding of how the system 70 and associated methods may work in a practical setting.

The system 70 is configured to initiate generation of the PRACH signal by having the PRACH-CM 7000 provide the first control signal 7100a to the IFT-module 72, here illustrated as an inverse fast Fourier transform, IFFT, module. The first control signal 7100a comprises an initiation parameter, ifft_trigger, which is configured to cause the IFFT-module 72 to generate the first time-domain sequence 710a, 1010a.

Specifically, the ifft_trigger initiation parameter causes the IFFT-module 72 to obtain a frequency-domain preamble sequence 1008a from a memory MEM, MEM1, MEM2. The memory may be either implemented as two or more separate memories MEM1, MEM2 or as a shared memory MEM. For illustrative purposes, two separate memories will be assumed. The first control signal 7100a causes the IFFT-module 72 to obtain the frequency-domain preamble sequence 1008a from a first memory MEM1 of the two separate memories.

The frequency-domain preamble sequence 1008a may be a Zadoff-Chu sequence comprising $N_{ZC}$ frequency domain samples, as illustrated in FIG. 10. Once the Zadoff-Chu sequence has been obtained, the IFFT-module performs an IFFT of the Zadoff-Chu sequence in order to obtain the first time-domain sequence 1010a. The first time-domain sequence comprises a first set time-domain samples. The first set time-domain samples comprises $N_{IFFT}$ total number of time-domain samples. The system 70 is further configured to store the first time-domain sequence 1010a in a second memory MEM2 of the two memories MEM1, MEM2.

The system 70 further comprises a switch 73 arranged between the third signal interface 740 of the interpolation circuitry 700 and the DAC 74. The switch 73 is configured to allow communication between the interpolation circuitry 700 and the DAC 74 when the switch is closed, and prevent said communication when the switch 73 is open. The switch 73 is configured to receive third control signals 7300a from a third control signal interface 7300 of the PRACH-CM 7000.

The third control signal interface 7300 is also configured to transmit third control signals 7300a to a carrier frequency offset, CFO, and direct current offset, DCO module 78. The CFO+DCO-module 78 is configured to update, in response to a third control signal 7300a, a phase of a time-domain sequence being provided to the DAC from the third signal interface 740 of the interpolation circuitry 700 based on a carrier frequency offset, CFO, and a direct current offset, DCO.

The interpolation circuitry 700 is configured to read the first time-domain sequence 710a, 1010a starting at the CP-first index $N_{IFFT}-N_{CPDEC}$ (possibly +1 depending on how the first time-domain sequence is index; starting from zero or one) and extra n samples (corresponding to a size of the filter transient response after interpolation), and to generate the a number of samples that correspond to the output transient response. According to some aspects, the number of samples generated are more or less than the number of samples corresponding to the transient response, the difference between the number of generated samples and the number of samples corresponding to the transient response falling within a predetermined error margin. Specifically, the PRACH-CM provides second control signals 7200a to the interpolation circuitry 700. The second control signal 7200a comprises an interpolation trigger parameter, interp_trigger, indicating that the interpolation circuitry shall obtain the first time-domain sequence from the memory MEM2 and perform interpolation (interp_trigger=1).

The second control signal 7200a further comprises start, stop and transient response parameters, input_init_idx, output_init_idx and num_output, respectively. The start parameter input_init_idx is set to the index in the first time-domain sequence 710a, 1010a where the interpolation is to begin, here $N_{IFFT}-N_{CPDEC}-n+1$. The samples from the start parameter input_init_idx to the last index of the first time-domain sequence $N_{IFFT}$ defines a subset of the first time-domain sequence.

The stop parameter output_init_idx is set to the index of the corresponding interpolated subset, i.e. output_init_idx=$N_{TDPS}-N_{CP}-n*F_{interpol}+1$, wherein $F_{interpol}$ is the interpolation factor $N_{TDPS}/N_{IFFT}$ defined in relation to FIG. 3.

The transient response parameter num_output is set to the size of the interpolated set of time-domain samples corresponding to the transient response of interpolation filters of the interpolation circuitry 700, i.e. num_output=$n*F_{interpol}$.

During interpolation of the transient response the interpolation circuitry output will be discarded (thus output transient response won't be transmitted). The interpolation circuitry output is discarded by setting the switch 73 to be in an open state. This is done by the PRACH-CM, which provides a third control signal 7300a to the switch. The third control signal 7300a comprises a switch parameter, prach_seq_valid, configured to open the switch (prach_seq_valid=0).

While this happens, the CFO+DCO-module 76 receives the initial phase configuration which correspond to the CFO and DCO phases required for the first sample in the CP of the PRACH signal. In other words, the third control signal 7300a also comprises a parameter for carrier frequency offset, cfo_init_value, and a parameter for direct current offset, dco_init_value.

With the transient response discarded, the CP of the PRACH signal can be generated. Here the first interpolated output time-domain sample will correspond to the first valid CP time-domain sample. The interpolation circuitry 700 is configured to generate the number of samples corresponding to the CP-length (thus the interpolation circuitry will consume up to the final sample of the first time-domain sequence with the index $N_{IFFT}$). The interpolation is triggered by the PRACH-CM setting interp_trigger=1. The CP-length is indicated by the PRACH-CM setting num_output=$N_{CP}$. The switch gets closed by setting prach_seq_valid=1, and the CFO+DCO generation gets enabled, thus causing the CP of the PRACH signal to be generated and propagated to the DAC 74 on the fly.

When the CP has been generated the interpolation circuitry is reset, and the CFO+DCO-module 76 is configured to reset its initial phase to zero, in order to avoid distortion of the PRACH signal body generation due to the residual state left by previous steps. Specifically, the PRACH-CM provides a second control signal 7200a to the interpolation circuitry 700 comprising a reset parameter, interp_reset=1. The PRACH-CM also provides third control signals 7300a to the CFO+DCO-module setting cfo_init_value and dco_init_value to zero.

The interpolation circuitry 700 is further configured to generate the complete PRACH signal body, by reading the complete first time-domain sequence (from sample 1 to sample $N_{IFFT}$), and thus generating $N_{TDPS}$ interpolated output samples, the second time-domain sequence. During this process the interpolator output switch is closed, and the CFO+DCO generation block is enabled. In other words, the PRACH-CM is configured to set num_output=$N_{TDSP}$, input_init_idx=1, interp_trigger=1 and prach_seq_valid=1.

The parameter prach_seq_valid, which controls the switch 76, thus serves the dual function to discard transient output time-domain samples and enable the generation of CFO and DCO.

Figure 8:
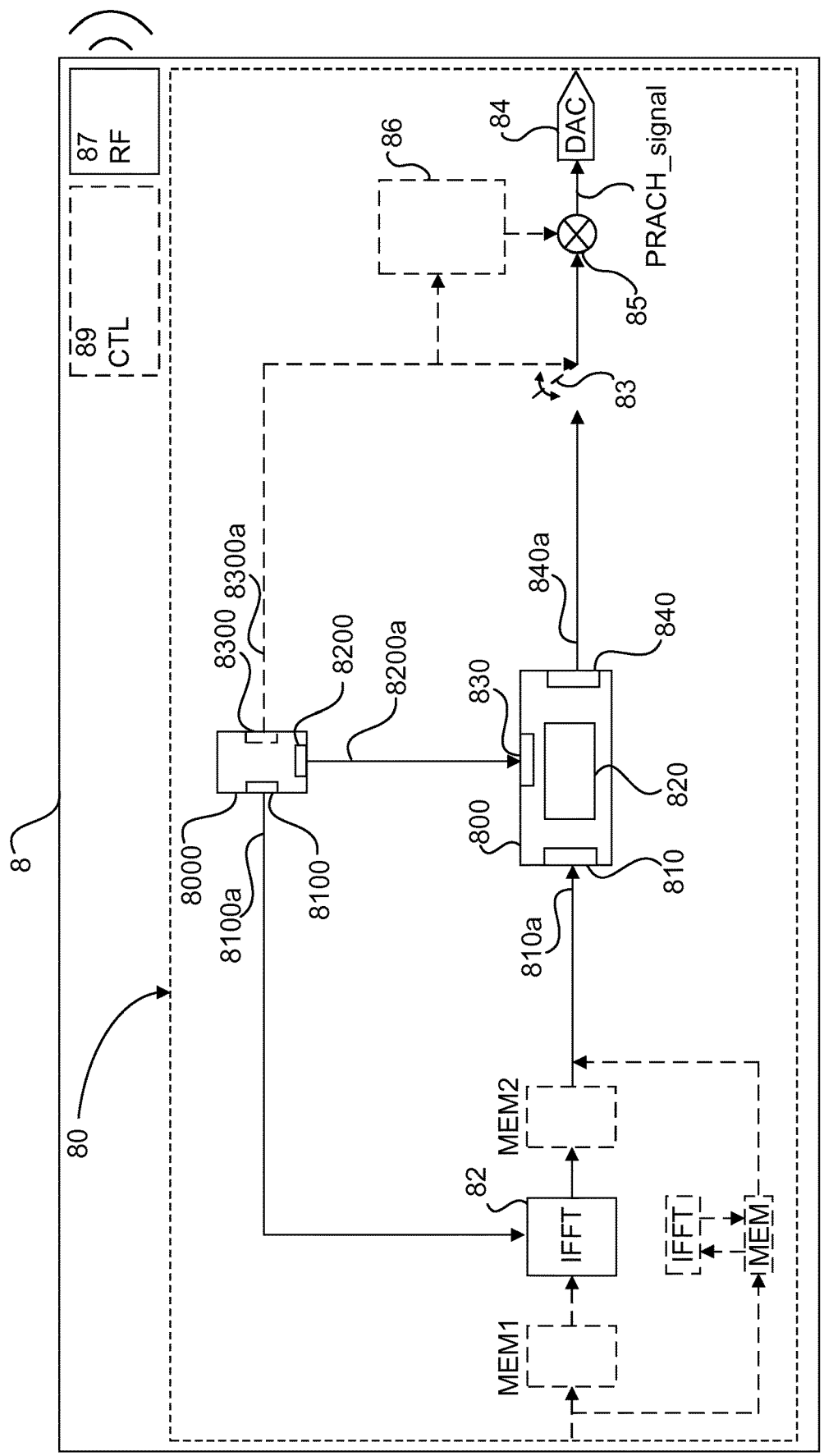
FIG. 8 illustrates a user equipment for PRACH signal generation according to the present disclosure.

FIG. 8 illustrates a user equipment, UE, 8 for physical random access channel, PRACH, signal generation.

The UE comprises a system 80 for PRACH signal generation.

The system 80 comprises a digital-to-analogue converter, DAC, 84 having a predetermined sampling rate.

The system 80 further comprises an inverse Fourier transform, IFT, module, 82 configured to generate a first time-domain sequence 810a comprising a first set of time-domain samples based on a frequency-domain preamble sequence.

The system also comprises interpolation circuitry 800. The interpolation circuitry comprises a first signal interface 810 configured to obtain the first time-domain sequence 810a. The interpolation circuitry further comprises a second signal interface 830 configured to obtain interpolation control signals 830a. The interpolation control signals are configured to cause the interpolation circuitry 800 to generate a second time-domain sequence 840a comprising a second set of time-domain samples. The second set of time-domain samples comprises the first set of time-domain samples and interpolated time-domain samples inserted between the samples of the first set of time-domain samples. The number of samples in the second set of time-domain samples matches a required number of samples of the DAC sampling rate. The interpolation circuitry further comprises control circuitry 820 configured to generate the second time-domain sequence 840a. The interpolation circuitry 800 additionally comprises a third signal interface 840 configured to provide the second time-domain sequence 840a, 1040a to the DAC 84.

The system 80 further comprises a PRACH control module, CM, 8000. The PRACH-CM comprises a first control signal interface 8100 configured to provide a first control signal 8100a to the IFT module 82. The first control signal is configured to cause the IFT module 82 to generate the first time-domain sequence 810a. The PRACH-CM further comprises a second control signal interface 8200 configured to provide a second control signal 8200a to the interpolation circuitry 800. The second control signal 8200a is configured to cause the interpolation circuitry 800 to generate the second time-domain sequence 840a, 1040a.

The UE may comprise a system for PRACH signal generation having all the optional modules and configurations as illustrated in relation to FIG. 7

The UE 8 further comprises a radio antenna 87 configured to transmit and receive radio signals.

The UE 8 thereby implement the disclosed method for PRACH signal generation. The UE 8 is further configured to transmit the generated PRACH signal via the radio antenna 87.

The UE may also comprise UE control circuitry 89 configured to control the UE. The UE control circuitry 89 may comprise a memory and a processor for storing and executing a computer program, respectively. In particular, the memory may comprise a computer program as illustrated in relation to FIG. 9, below.

Figure 9:
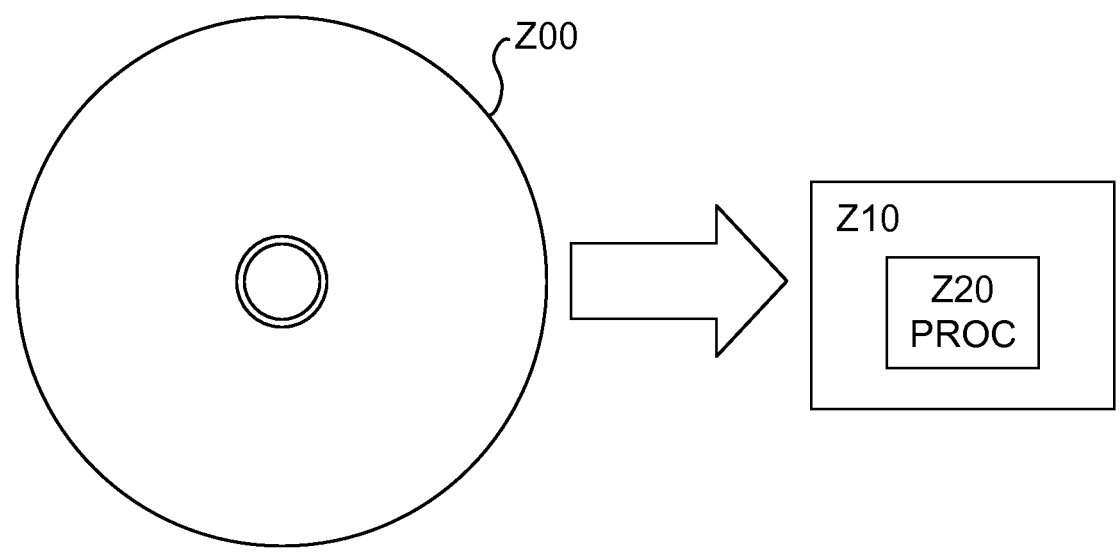
FIG. 9 illustrates a computer program product according to the present disclosure.

FIG. 9 illustrates a computer program product comprising a non-transitory computer readable medium ZOO, having thereon a computer program comprising program instructions. The computer program is loadable into a data processing unit Z10 and configured to cause execution of any of the methods for PRACH signal generation disclosed herein when the computer program is run by the data processing unit.

FIG. 10 illustrates the frequency- and time-domain sequences generated during the disclosed method for PRACH signal generation. The frequency- and time-domain sequences will typically appear in a temporal sequence from top to bottom of FIG. 10. A first time-domain sequence comprising a first set of time-domain samples is generated by applying an inverse Fourier transform to a set of frequency-domain samples, typically a Zadoff-Chu sequence.

One part of the first set of time-domain samples is interpolated to generate a set of time-domain samples corresponding to a transient response of the interpolation filter(s) responsible for the interpolation.

A second part of the first set of time-domain samples is interpolated to generate a cyclic prefix for the intended PRACH signal.

Finally, the whole first set of time-domain samples are interpolated to generate a second set of time-domain samples corresponding to the PRACH signal body.

It is to be understood that aspects and technical features illustrated in relation to a particular figure may be applied to any of the aspects and embodiments illustrated in other figures, unless explicitly stated otherwise. Furthermore, any illustration of a method step or aspect may, mutatis mutandis, be implemented as a system technical feature, and vice versa.

While the present disclosure has mainly be illustrated in relation to 5G NR, it is not limited to 5G NR; other examples where the present disclosure may be applied include internet of things, IoT, and 3rd Generation Partnership Project Long Term Evolution, LTE. Accordingly, although specific terms are employed, they are used in a generic and descriptive sense only and not for purposes of limitation, the scope of the embodiments being defined by the following claims.

The invention claimed is:

1. A method for physical random access channel (PRACH) signal generation, the method comprising:
   obtaining a first time-domain sequence comprising a first set of time-domain samples;
   generating a second time-domain sequence comprising a second set of time-domain samples, the second set of time-domain samples comprising the first set of time-domain samples and interpolated time-domain samples inserted between the samples of the first set of time-domain samples, wherein a number of time-domain samples in the second set of time-domain samples matches a required number of samples needed for a digital-to-analog converter (DAC) having a predetermined sampling rate;

providing the second time-domain sequence to the DAC;

determining a first index of the first time-domain sequence, wherein the first index is configured to define a subset of the first set of time-domain samples comprising the time-domain samples between the first index and a second index corresponding to the last time-domain sample of the first time-domain sequence;

wherein the subset comprises a number of time-domain samples for generation of a number of time-domain samples corresponding to a cyclic prefix of the second time-domain sequence by insertion of interpolated time-domain samples between the samples of the subset; and generating a cyclic prefix comprising the determined subset of time-domain samples and interpolated time-domain samples inserted between the samples of the determined subset, a number of time-domain samples in the cyclic prefix comprising a number of samples needed for matching the required number of samples needed for the DAC sampling rate.

2. The method of claim 1, wherein the generating the second time-domain sequence is performed by interpolation circuitry.

3. The method of claim 1, wherein the obtaining the first time-domain sequence comprises generating the first time-domain sequence based on a frequency-domain preamble sequence.

4. The method of claim 1, wherein a number of time-domain samples in the first set of time-domain samples is less than the required number of samples needed for the DAC sampling rate.

5. The method of claim 1, wherein the cyclic prefix is generated before the second set of time-domain samples is generated.

6. The method of claim 1, further comprising appending, to the determined subset of time-domain samples, a set of extra time-domain samples of the first set of time-domain samples which, when having interpolated time-domain samples inserted between the set of extra time domain samples, correspond to a duration of an interpolation filter output transient response.

7. The method of claim 6, wherein the cyclic prefix is generated before the second set of time-domain samples is generated.

8. The method of claim 1, further comprising updating a phase of the second time-domain sequence based on a carrier frequency offset and a direct current offset.

9. The method of claim 8, wherein the updating the phase is performed on a real-time basis.

10. A system for physical random access channel (PRACH) signal generation, the system comprising:
a digital-to-analog converter (DAC) having a predetermined sampling rate;
an inverse Fourier transform (IFT) module, configured to generate a first time-domain sequence comprising a first set of time-domain samples based on a frequency-domain preamble sequence;
interpolation circuitry, the interpolation circuitry comprising:
a first signal interface configured to obtain the first time-domain sequence;
a second signal interface configured to obtain interpolation control signals, the interpolation control signals being configured to cause the interpolation circuitry to generate a second time-domain sequence comprising a second set of time-domain samples, the second set of time-domain samples comprising the first set of time-domain samples and interpolated time-domain samples inserted between the samples of the first set of time-domain samples, a number of samples in the second set of time-domain samples matching a required number of samples of the DAC sampling rate;
control circuitry configured to generate the second time-domain sequence; and
a third signal interface configured to provide the second time-domain sequence to the DAC;
a PRACH control module comprising:
a first control signal interface configured to provide a first control signal to the IFT module, the first control signal being configured to cause the IFT module to generate the first time-domain sequence; and
a second control signal interface configured to provide a second control signal to the interpolation circuitry, the second control signal being configured to cause the interpolation circuitry to:
generate the second time-domain sequence; and
provide the second time-domain sequence to the DAC.

11. The system of claim 10, wherein the IFT module comprises an inverse fast Fourier transform (IFFT) module.

12. A user equipment for physical random access channel (PRACH) signal generation, the UE comprising:
a system for PRACH signal generation, the system comprising:
a digital-to-analog converter (DAC) having a predetermined sampling rate;
an inverse Fourier transform (IFT) module, configured to generate a first time-domain sequence comprising a first set of time-domain samples based on a frequency-domain preamble sequence;
interpolation circuitry, the interpolation circuitry comprising:
a first signal interface configured to obtain the first time-domain sequence;
a second signal interface configured to obtain interpolation control signals, the interpolation control signals being configured to cause the interpolation circuitry to generate a second time-domain sequence comprising a second set of time-domain samples, the second set of time-domain samples comprising the first set of time-domain samples and interpolated time-domain samples inserted between the samples of the first set of time-domain samples, a number of samples in the second set of time-domain samples matching a required number of samples of the DAC sampling rate;
control circuitry configured to generate the second time-domain sequence; and
a third signal interface configured to provide the second time-domain sequence to the DAC;

a PRACH control module comprising:
- a first control signal interface configured to provide a first control signal to the IFT module, the first control signal being configured to cause the IFT module to generate the first time-domain sequence; and
- a second control signal interface configured to provide a second control signal to the interpolation circuitry, the second control signal being configured to cause the interpolation circuitry to:
  - generate the second time-domain sequence; and
  - provide the second time-domain sequence to the DAC; and a radio antenna configured to transmit and receive radio signals.

13. A physical random access channel (PRACH) control module for PRACH signal generation, the PRACH-control module comprising:
- a first control signal interface configured to provide a first control signal to an inverse Fourier transform (IFT) module, the first control signal being configured to cause the IFT module to generate a first time-domain sequence comprising a first set of time-domain samples based on a frequency-domain preamble sequence; and
- a second control signal interface configured to provide a second control signal to an interpolation circuitry, the second control signal being configured to cause the interpolation circuitry to:
  - generate a second time-domain sequence comprising a second set of time-domain samples based on the first set of time-domain samples, the second set of time-domain samples comprising the first set of time-domain samples and interpolated time-domain samples inserted between the samples of the first set of time-domain samples, a number of time-domain samples in the second set of time-domain samples matching a required number of samples needed for a digital-to-analog converter (DAC) having a predetermined sampling rate; and
  - provide the second time-domain sequence to the DAC;
  - determine a first index of the first time-domain sequence, wherein the first index is configured to define a subset of the first set of time-domain samples comprising the time-domain samples between the first index and a second index corresponding to the last time-domain sample of the first time-domain sequence;
  - wherein the subset comprises a number of time-domain samples for generation of a number of time-domain samples corresponding to a cyclic prefix of the second time-domain sequence by insertion of interpolated time-domain samples between the samples of the subset; and
  - generate a cyclic prefix comprising the determined subset of time-domain samples and interpolated time-domain samples inserted between the samples of the determined subset, a number of time-domain samples in the cyclic prefix comprising a number of samples needed for matching the required number of samples needed for the DAC sampling rate.

* * * * *